(12) United States Patent
Young et al.

(10) Patent No.: US 6,804,739 B1
(45) Date of Patent: Oct. 12, 2004

(54) STRUCTURE AND METHOD FOR MESSAGE SNOOPING IN SCSI BUS EXPANDERS

(75) Inventors: B. Arlen Young, Palo Alto, CA (US); John S. Packer, San Jose, CA (US); Wei Chuan Goh, Singapore (SG)

(73) Assignee: Adaptec, Inc., Milpitas, CA (US)

( * ) Notice: Subject to any disclaimer, the term of this patent is extended or adjusted under 35 U.S.C. 154(b) by 432 days.

(21) Appl. No.: 10/068,651

(22) Filed: Feb. 5, 2002

(51) Int. Cl.[7] .......................... G06F 13/38; G01B 21/00
(52) U.S. Cl. ..................... 710/300; 710/31; 370/230; 709/224
(58) Field of Search .............................. 710/300, 106, 710/31, 305, 52, 310, 313; 370/278, 912, 517, 230; 709/218, 232, 253, 224; 714/47; 700/1

(56) References Cited

U.S. PATENT DOCUMENTS 5,432,715 A * 7/1995 Shigematsu et al. ........ 702/188
6,032,205 A * 2/2000 Ogimoto et al. .............. 710/33
6,272,499 B1 * 8/2001 Wooten ...................... 707/102
6,459,680 B1 * 10/2002 Alperovich et al. ........ 370/230

OTHER PUBLICATIONS

"A new framework for secure network management" by Hatefi, F.G.; Golshani, F. (abstract only).*
"Real–time communication in plant–monitoring/controlling systems with ATM networks" by Mizunuma, I.; Horiike, S.; Takegaki, M.(abstract only).*

* cited by examiner

Primary Examiner—Gopal C. Ray
(74) Attorney, Agent, or Firm—Gunnison, McKay & Hodgson, L.L.P.; Forrest Gunnison (57) ABSTRACT

A SCSI selective options message delay expander includes a capability for monitoring messages transferred between a first port and a second port of the expander, for delaying a pre-selected message, for modifying the delayed pre-selected message, and for storing information obtained from the delayed pre-selected message. The ability to change messages allows the expander to be used with SCSI initiators and/or SCSI target devices that have SCSI characteristics different from the SCSI characteristics of the expander.

41 Claims, 4 Drawing Sheets

STRUCTURE AND METHOD FOR MESSAGE SNOOPING IN SCSI BUS EXPANDERS

BACKGROUND OF THE INVENTION

1. Field of the Invention

The present invention relates generally to message transfers over a SCSI bus between a SCSI target and a SCSI initiator, and more particularly to message transfers over a SCSI bus between a SCSI target and a SCSI initiator that pass through a SCSI expander.

2. Description of Related Art

As the performance of computer systems and computer networks has improved, the performance demands on buses in these systems and networks has steadily increased. In SCSI systems, as the SCSI data rates increased, the SCSI bus cabling became a significant source of signal distortion. With the higher SCSI data rates, attenuation of high frequency components of SCSI data signals, signal reflections along an individual line of a SCSI cable, skew of signal timings across multiple cable lines, and cross-talk of signals across multiple cable lines have constrained SCSI cable lengths. All of these effects distort SCSI signals making reliable detection of the SCSI signals increasingly more difficult.

A device, call a SCSI expander, was created to restore signal quality along a SCSI bus. Actually, the use of expander in the name of the device was a misnomer. Calling the device a SCSI repeater or a SCSI extender would have been more descriptive of the functionality of the device. A SCSI expander, as used herein, is a device that does not increase the total number of target SCSI devices on the SCSI bus, but does restore signal quality along the SCSI bus.

SCSI expanders were inserted at points along a SCSI bus between SCSI initiators and SCSI target devices to clean up signals on the SCSI bus. A SCSI expander received SCSI signals from a first expander port, and retransmitted the SCSI signals out a second expander port. The retransmitted SCSI signals had less distortion than the received SCSI signals thereby enabling longer total SCSI bus lengths.

Figure 1:
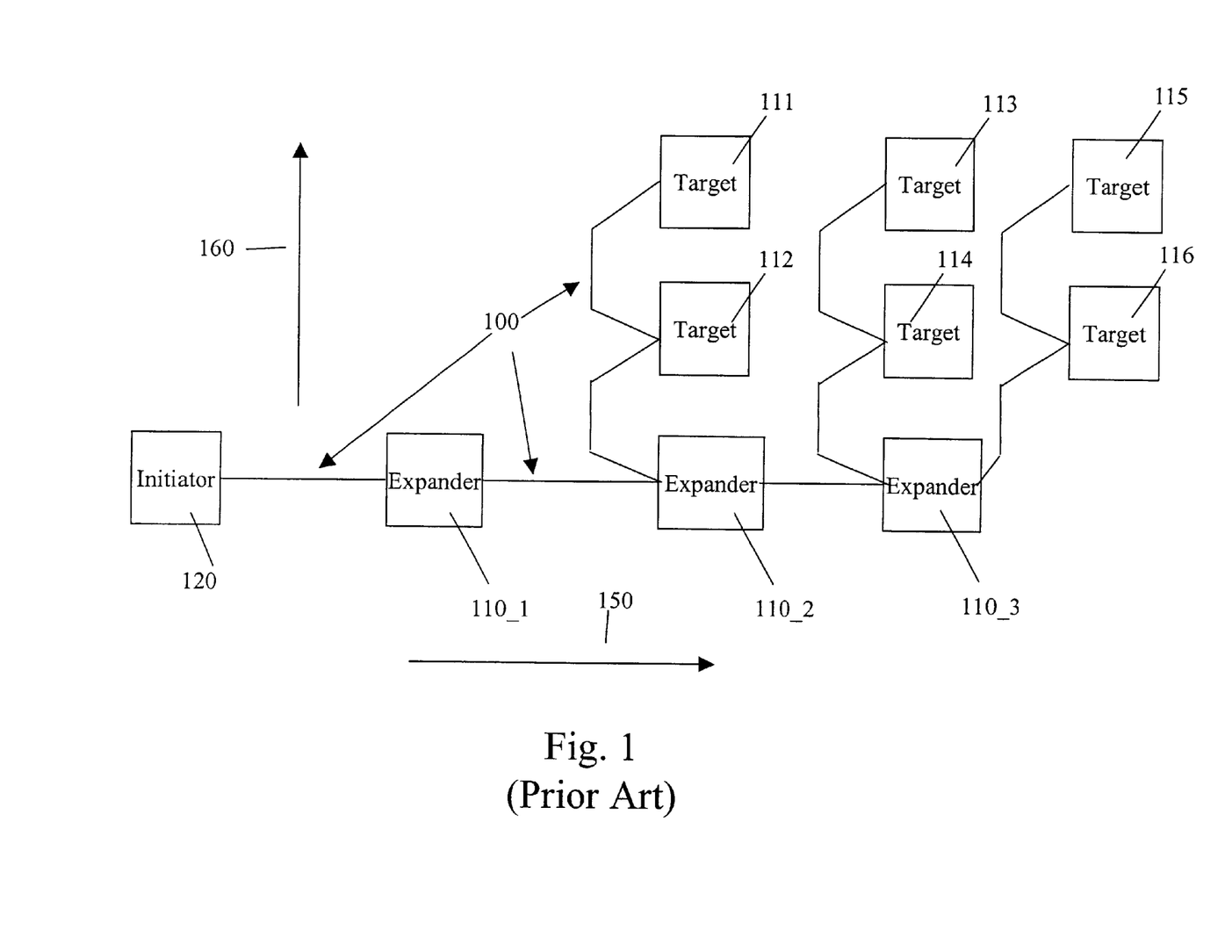
FIG. 1 is an illustration of a prior art SCSI bus system with a two-dimensional topology.

The introduction of SCSI expanders permitted changes in the SCSI bus topology. A SCSI bus without SCSI expanders had a one-dimensional topology. However, as illustrated in FIG. 1, a SCSI bus 100 with SCSI expanders 110_1 to 110_3 has a two-dimensional topology.

A first dimension 150 of the two-dimensional topology was defined by SCSI expanders 110_1 to 110_3 that were connected in series. A first expander 110_1 had a first port connected to initiator 120 and a second port connected to a first port of expander 110_2. A second port of expander 110_2 was connected to a first port of expander 110_3.

A second dimension 160 of the two-dimensional topology was defined by multiple daisy chains of SCSI target devices. Specifically, SCSI target devices 111 and 112 were connected to the second port of expander 110_1. SCSI target devices 113 and 114 were connected to the second port of expander 110_2 and SCSI target devices 115 and 116 were connected to the second port of expander 110_3. While the total number of SCSI target devices that could be connected to initiator 120 was not increased by the use of SCSI expanders, other more complex two-dimensional topologies of initiators, SCSI target devices, expanders and SCSI bus segments could be constructed.

Since SCSI expanders 110_1 to 110_3 only restored signal quality along SCSI bus 100, the presence of expanders 110_1 to 110_3 on SCSI bus 100 was not known either to initiator 120, or to SCSI target devices 111 to 116. Initiator 120 and SCSI target devices 111 to 116 conducted transactions over SCSI bus 100 using the same protocol as when expanders were not present. SCSI expanders 110_1 to 110_3 simply transferred communications from one port to another, and did not directly communicate with either initiators or SCSI target devices.

SUMMARY OF THE INVENTION

According to one embodiment of the present invention, a SCSI expander includes a capability for selectively delaying, saving, and modifying messages transferred between a SCSI initiator, sometimes called an initiator, and a SCSI target device, sometimes called a target. This novel message snooping capability has several advantages. It allows the SCSI expander to accurately follow the many different message sequences that can occur in SCSI data transfer options negotiations. It allows the SCSI expander to save information with respect to the data transfer options context for each SCSI initiator and SCSI target device pair on the SCSI bus. Finally, it allows the SCSI expander to be used in heterogeneous SCSI systems, i.e., in SCSI systems where a SCSI initiator, a SCSI target, and the SCSI expander may support different SCSI characteristics, such as data transfer rates, or perhaps signal conditioning requirements.

In one embodiment, traffic on a SCSI bus that is passed between a first port and a second port of the SCSI expander is monitored for a pre-selected message, or any message in a set of pre-selected messages. The pre-selected messages include messages used to negotiate SCSI data transfer options between an initiator and a target.

When the SCSI expander detects one of the pre-selected messages, transfer of the message between the first and second ports is delayed. The pre-selected message is loaded into a buffer and when a predefined number of units of the pre-selected message, e.g., the complete pre-selected message, is in the buffer, a processor processes the message.

The processing can include simply saving for future use information in the delayed pre-selected message that characterizes the data transfer options. In one embodiment, the processing by the processor modifies the data transfer options so that the data transfer options negotiated between the SCSI initiator and the SCSI target are supported by the SCSI expander. After the processor completes processing the delayed pre-selected message, the pre-selected message is passed out of the expander.

In one embodiment, the pre-selected message is delayed by delaying transfer of only a last unit of the pre-selected message between the first and second ports. Herein, a message includes at least one unit, e.g., a byte, or a word, and may include a plurality of units.

In another embodiment, the complete message is delayed. In general, a portion of the message from a pre-selected unit of the message thru the last unit of the message is delayed. In the first mentioned embodiment, the pre-selected unit is the last unit and in the second mentioned embodiment, the pre-selected unit is the first unit. In yet another embodiment, the pre-selected unit is a unit between the first unit and the last unit of the pre-selected message. After processing, the portion of the pre-selected message that has not been transferred between the first and second ports is released.

Hence, a SCSI expander, in one embodiment of the present invention, includes a first port, a second port, and a message delay buffer coupled to the first port and to the second port. The SCSI expander also includes a message snooping status comprising a plurality of message status flags and a message-snooping logic circuit coupled to the message delay buffer and to the message snooping status. Upon detection of a pre-selected message being transferred between the first and second ports, the message-snooping logic circuit (i) asserts one of the plurality of message status flags, (ii) enables the message delay buffer to receive the selected message, and (iii) delays transfer of the pre-selected message between the first and second ports.

In one embodiment, one of the plurality of message status flags includes a message-delay status flag. The plurality of message status flags also includes a message-direction flag having a first state and a second state where the particular state of the message-direction flag indicates a direction of transfer of the message between the first and second ports. The plurality of message status flags further includes a message-received status flag having first and second states where the second state of the message-received status flag indicates the message delay buffer contains a predefined number of units, e.g., all of the units, of the pre-selected message. The plurality of message status flags still further includes a message-release flag having a first state and a second state where the second state of the message-release flag indicates that any un-transferred units of the pre-selected message contained in the message delay buffer can be transferred through the SCSI expander.

The SCSI expander also includes a sequencer coupled to the message snooping status and to the message delay buffer. Upon detecting the second state of the message-received status flag, the sequencer saves information contained in the message delay buffer as saved message information. This saved message information also includes the message-direction flag.

The SCSI expander further includes a data transfer option table stored in a memory coupled to the sequencer. The sequencer updates the data transfer option table using the saved message information upon determining that a SCSI data transfer option negotiation completed successfully.

In one embodiment, the SCSI expander includes a message unit modification circuit coupled to the message-snooping logic circuit and to the message delay buffer. The message unit modification circuit modifies a unit of the pre-selected message contained in the message delay buffer.

Hence, in one embodiment, the SCSI expander of the present invention monitors messages transferred between a first port and a second port of the SCSI expander for a message used for negotiating data transfer options over a SCSI bus. The SCSI expander delays transfer of the message between the first and second ports of the SCSI expander upon the monitoring messages detecting the message. In one embodiment, the monitoring is performed only during SCSI bus message phases.

The delaying transfer of the message includes asserting a message-delay status flag upon the monitoring messages detecting the message, and loading the message into a message delay buffer, or at least a pre-selected number of units of the message into the message delay buffer. A message-received status flag is asserted upon the message being loaded in the message delay buffer.

The SCSI expander saves information in the message after the message-received status flag is asserted and asserts a message-release flag after saving the information. Any portion of the message that has not been transferred through the SCSI expander is released from the message delay buffer after the message-release flag is asserted. In one embodiment, the any portion is the message. In another embodiment, the any portion is a last unit of the message. In still another embodiment, the any portion includes units in the message from a pre-selected unit of the message to a last unit of the message. The unit or units that are released may be released individually one after the one, in a group, or in sets of units with one set after the other being released.

In yet another embodiment of the present invention in a SCSI expander, a method includes:

detecting a message phase on a SCSI bus;

monitoring, upon detecting the message phase, messages transferred between a first port and a second port of the SCSI expander for a message used in negotiating data transfer options over the SCSI bus;

entering a message delay state upon the monitoring messages detecting the message;

determining whether a next unit of the message to be transferred between the first and second ports is a pre-selected unit;

transferring the next unit between the first and second ports and loading the next unit into a message delay buffer, upon determining the next unit of the message is not the pre-selected unit; and loading the next unit into the message delay buffer and delaying transfer of the next unit and any subsequent units of the message between the first and second ports, upon determining the next unit of the message is the pre-selected unit.

BRIEF DESCRIPTION OF THE DRAWINGS

In the figures and the following detailed description, elements with the same reference numeral are the same or similar elements. Also, the first digit of a reference numeral is the figure number of the first figure in which the element with that reference numeral appears.

DETAILED DESCRIPTION

Figure 2A:
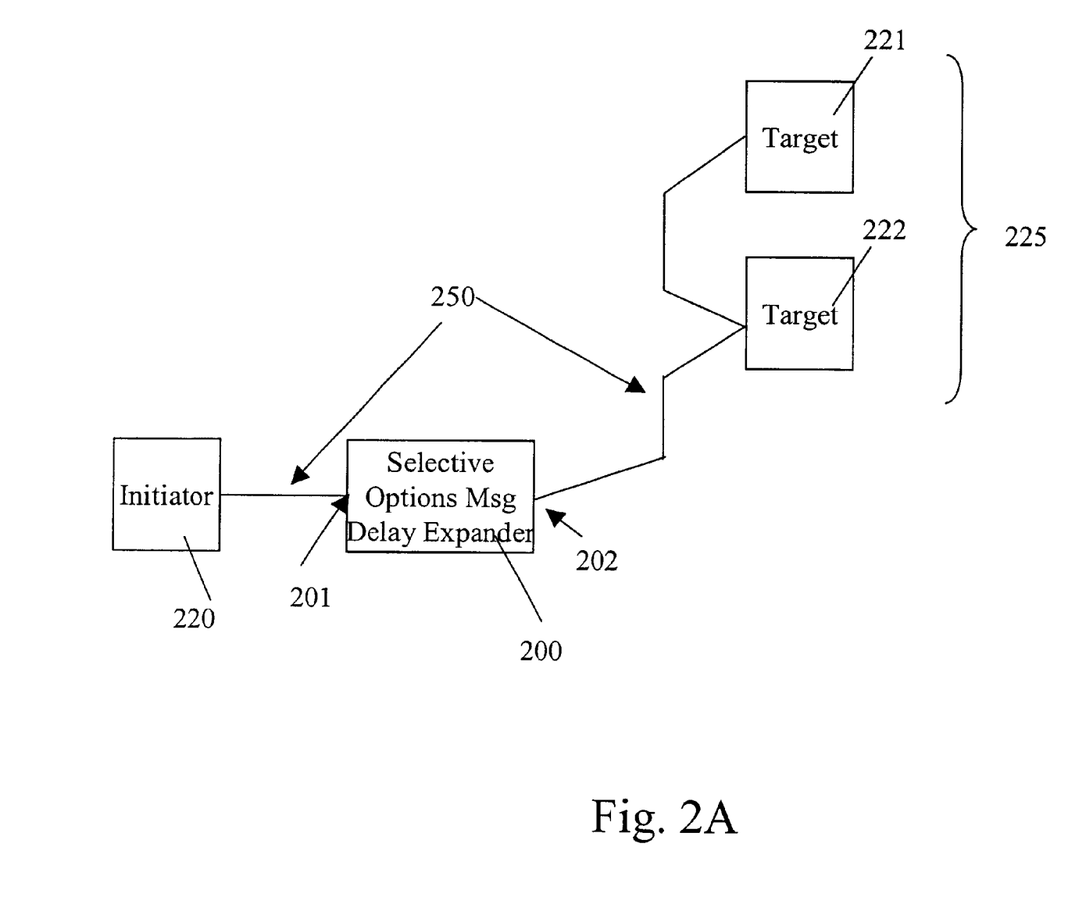
FIG. 2A is an illustration of one embodiment of a SCSI bus system that includes a SCSI selective options message delay expander of the present invention.

According to one embodiment of the present invention, a SCSI selective options message delay expander 200, sometimes called expander 200, includes a capability for monitoring messages transferred between a first port 201 and a second port 202 of expander 200, and to store information obtained from the monitored message. In addition, expander 200 optionally contains an ability to change messages so that expander 200 can be used with SCSI initiators and/or SCSI target devices that have SCSI characteristics different from the SCSI characteristics of expander 200.

SCSI bus protocols provide many different options for conveying data across a SCSI bus 250. Initiators and targets negotiate these options using Parallel Protocol Request messages, Synchronous Data Transfer Request messages, or Wide Data Transfer Request messages. The protocol for negotiating a data transfer options agreement between a SCSI initiator and a SCSI target device is defined by the SCSI standards. This protocol includes the information necessary to identify a particular message and the size of the message. See for example, "Information Technology—SCSI Parallel Interface-4 (SPI-4)," Rev. 1, American National Standards Institute, 11 W. $42^{nd}$ Street, New York, N.Y., October 2000, which is incorporated herein by reference in its entirety as a demonstration of the knowledge of one of skill in the art.

Since expander 200 cannot communicate directly with a SCSI initiator 220, or with SCSI target devices 221 and 222, expander 200 utilizes a novel method to snoop data transfer options negotiations between initiator 220 and any one of a plurality of SCSI target devices 225. As explained more completely below, expander 200 monitors an exchange of messages between SCSI initiator 220 and a SCSI target device, e.g., SCSI target device 221, during the data transfer options negotiation. Expander 200 accurately interprets the exchange of messages and saves the final set of data transfer options that is negotiated between SCSI initiator 220 and SCSI target device 221 in a data transfer options table 241 (See FIG. 2B).

The protocol for the message exchanges becomes somewhat complex if errors are observed, or messages are rejected. Nevertheless, expander 200 correctly monitors and interprets the message transfers and determines the data transfer options used for each target-initiator combination on SCSI bus 250 that negotiate options for data exchange. Herein, target is used as shorthand for a SCSI target device. Similarly, initiator is used as shorthand for a SCSI initiator device.

Figure 2B:
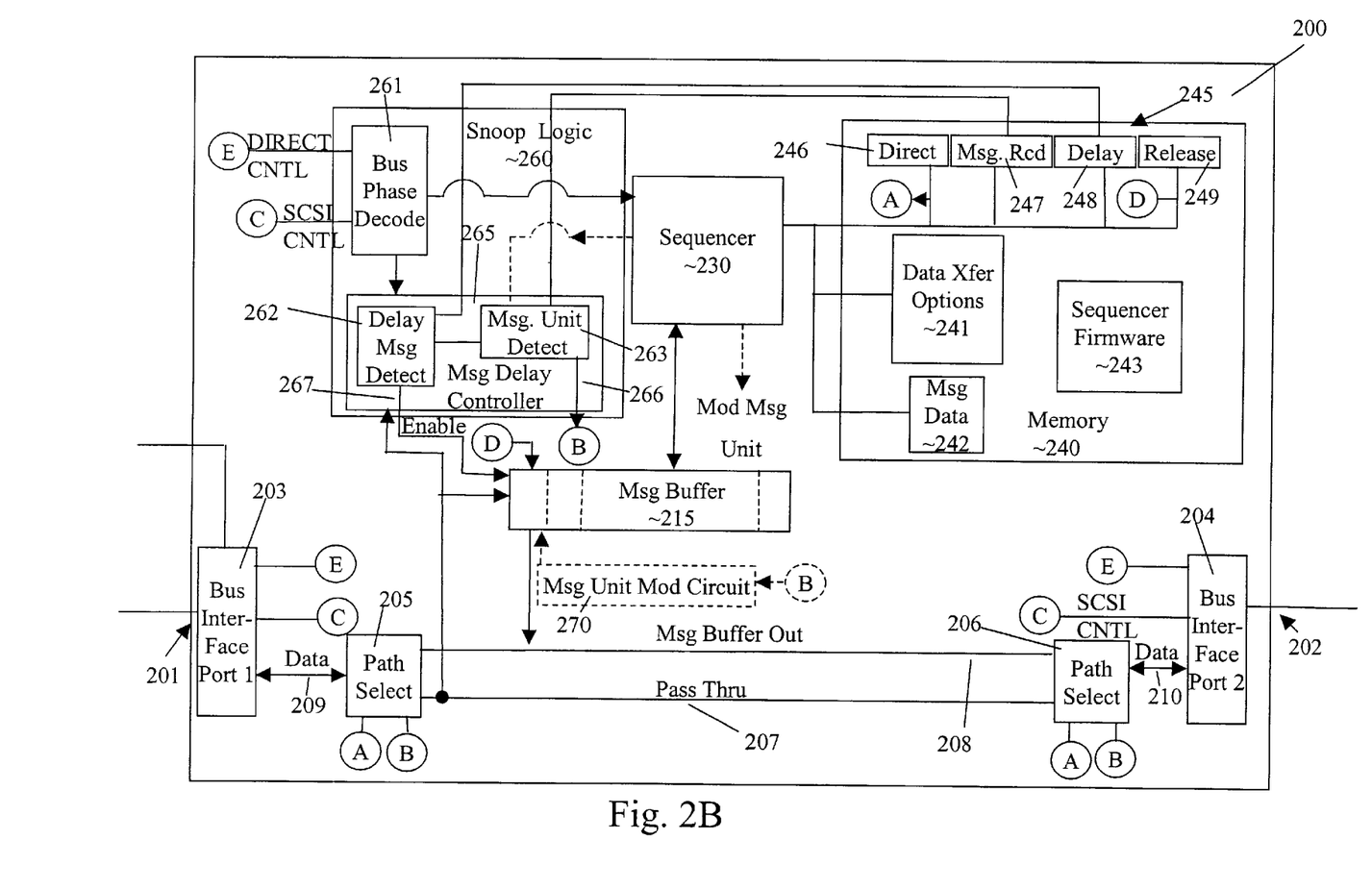
FIG. 2B is a more detailed illustration of one embodiment of the SCSI selective options message delay expander of FIG. 2A.

FIG. 2B is a more detailed block diagram of one embodiment of expander 200. In this embodiment, expander 200 includes an on-chip processor, e.g., sequencer 230, which is coupled to a memory 240, to a message delay buffer 215, and to a message-snooping logic circuit 260.

Sequencer 230 executes sequencer firmware 243, which controls the operations performed by sequencer 230. In view of this disclosure, those of skill in the art can provide the instructions necessary to implement the invention for the particular processor used with the SCSI expander. One sequencer suitable for use in this invention is disclosed in U.S. Pat. No. 5,659,690, entitled "Programmably Configurable Host Adapter Integrated Circuit Including a RISC Processor," of Stuber et al., which is incorporated herein by reference in its entirety.

Message-snooping logic circuit 260 detects when any one of a plurality of pre-selected SCSI messages are passing between ports 201 and 202. When message-snooping logic circuit 260 detects one of the pre-selected messages, message-snooping logic circuit 260 causes expander 200, as explained more completely below, to load the pre-selected message into message delay buffer 215. Message-snooping logic circuit 260 also asserts a message-delay status flag 248 in a message snooping status 245 to indicate to sequencer 230 that expander 200 is in a delay state. The delay state indicates to sequencer 230 that a data transfer options negotiation is in progress on SCSI bus 250.

When message-delay status flag 248 is asserted, the complete pre-selected message is not passed directly from the input port of expander 200 to the exit port of expander 200. (Herein, the exit port and input port are defined by the direction of data transfer for a particular message.) The complete pre-selected message is not passed to the exit port until sequencer 230 has processed the pre-selected message, as explained below. Hence, the transfer of the pre-selected message through expander 200 is delayed.

In one embodiment, when the complete pre-selected message is in message delay buffer 215, message-snooping logic circuit 260 asserts a message-received status flag 247 in message snooping status 245, i.e., changes the state of flag 247 from a first state to a second state. The second state of flag 247 indicates to sequencer 230 that a complete pre-selected message is contained in message delay buffer 215. Alternatively, message-received status flag 247 is asserted after a pre-selected unit of the pre-selected message is in message delay buffer 215 and then sequencer 230 determines when the complete pre-selected message is in buffer 215.

After detecting assertion of message-received status flag 247, sequencer 230 reads the pre-selected message that is stored in message delay buffer 215, and determines the status of the options negotiation sequence on SCSI bus 250. Only after sequencer 230 has determined the status and saved any necessary information does sequencer 230 assert a message-release flag 249 in message snooping status 245. If the data transfer options negotiation between initiator 220 and target 221 is complete, sequencer 230 updates data transfer options information in data transfer options table 241 for data transfers between initiator 220 and selected target device 221. When message-release flag 249 is asserted, the portion of the selected message in message buffer 215 that has not been transmitted to the exit port is released onto message-buffer-out bus 208 to the exit port of expander 200.

In one embodiment, the pre-selected messages delayed by expander 200 are limited to SCSI messages that are transferred infrequently over SCSI bus 250. In this embodiment, the pre-selected messages include SCSI Target Reset, Parallel Protocol Request (PPR), Synchronous Data Transfer Request (SDTR), and Wide Data Transfer Request (WDTR) messages. In the future, any other messages that expander 200 must understand to correctly receive data from SCSI bus 250 and retransmit the data to SCSI bus 250 should be included in the pre-selected messages. Delaying the pre-selected messages and all following contiguous messages for observation by sequencer 230 causes a negligible degradation of system performance.

Messages that are not included in the pre-selected messages and that are not of interest with respect to correctly receiving and retransmitting data are transferred very frequently over SCSI bus 250. Herein, any message that is not delayed by expander 200 is referred to as an unselected message.

The unselected messages include, but are not limited to, SCSI Identify, Tagged Queue, Save Data Pointers, Disconnect, and Task Complete messages. Delay of the unselected messages by expander 200 is likely to cause a noticeable degradation of SCSI bus performance, because of the frequency of such messages. Consequently, in this embodiment, the unselected messages are not delayed if the unselected messages are not contiguous with one of the pre-selected messages so that the pre-selected and unselected messages form a contiguous message string. Of course, if the degradation of performance associated with delaying one or more of the unselected messages is not of importance, these unselected messages also could be detected and delayed by message-snooping logic circuit 260.

In this embodiment of the invention as explained above, expander 200 has two ports, a first port 201 and a second port 202. Port 201 connects a SCSI cable to bus interface port one circuit 203. Bus interface port one circuit 203 connects the control lines of the SCSI bus to a bus phase decode circuit 261 in message-snooping logic circuit 260 and to bus interface port two circuit 204.

In FIG. 2B, only the elements necessary to aid in understanding the present invention are illustrated. As is known to those of skill in the art, as the signals on the SCSI bus are passed through expander 200 the received signals are conditioned for retransmission. However, this circuitry is not illustrated in FIG. 2B to avoid detracting from the present invention. Consequently, the continuous lines between ports 201 and 202 should be interpreted as including the circuitry commonly found in a SCSI bus expander, and the particular form of this circuitry is not essential to this invention. Also, any signal delays introduced by this circuitry are not considered herein, because such delays are equivalent to those in the prior art expanders.

Internal data bus 209 from port 201 is connected to a first path selector circuit 205. Path selector circuit 205 connects internal data bus 209 to one of a message-buffer-out data bus 208, and a pass-thru data bus 207. The particular connection established by path selector circuit 205 is determined by two path control input signals from message-direction flag 246 and pass-to-delay buffer line 266, in this embodiment.

Internal data bus 210 from port 202 is connected to a second path selector circuit 206. Path selector circuit 206 connects internal data bus 210 to one of message-buffer-out data bus 208, and pass-thru data bus 207. The particular connection established by path selector circuit 206 also is determined by two path control input signals from message-direction flag 246 and pass-to-delay buffer line 266.

Table 1 is an example of one embodiment of the connections established by selector circuits 205 and 206 for the indicated input signal levels. Table 1 is illustrative only and is not intended to limit the invention to this specific embodiment. In view of this disclosure, those of skill in the art can implement path selector circuits 205 and 206 in a wide variety of ways.

TABLE 1

| Flag 246 | Line 266 | Selector 205 | Selector 206 |
|---|---|---|---|
| Don't Care | 0 | Pass-thru | Pass-thru |
| 0 | 1 | Pass-thru | Delay Msg Buffer Out |
| 1 | 1 | Delay Msg Buffer Out | Pass-thru |

During normal operation of expander 200, e.g., at times when a pre-selected message is not being passed between SCSI initiator 220 and one of SCSI targets 221 and 222, the signals are passed from port 201 to port 202 and from port 202 to port 201 via pass-thru data bus 207. However, the signals on pass-thru data bus 207 are also input to message-snooping logic circuit 260. In this embodiment, in addition to a bus phase decode circuit 261, message-snooping logic circuit 260 includes a message delay controller circuit 265 that in turn includes a delay message detector 262 and a message unit detector 263.

Bus phase decode circuit 261 is similar to bus phase decode circuits commonly found in SCSI host adapters, and determines the SCSI bus phase. Bus phase decode circuit 261 asserts a bit(s) in a bus phase register (not shown) to indicate the bus phase. In this embodiment, bus phase decode circuit 261 provides the bus phases to message delay controller 265 and to sequencer 230.

Message delay controller 265 is configured to detect a pre-selected message or each pre-selected message in a plurality of pre-selected messages. In one embodiment, message delay controller 265 includes automated hardware that detects a pre-selected SCSI bus message from either port 201 or port 202, i.e., delay message detector 262 is hardwired to detect the pre-selected message or messages. For example, a hardwired decoder is used to detect the pre-selected messages.

In another embodiment, sequencer 230 uses message data 242 to configure reconfigurable registers in delay message detector 262 that are used in detecting the pre-selected message or messages. Similarly, message unit detector 263 can be configured to detect a particular unit, e.g., byte, in a pre-selected message. See copending, commonly filed, and commonly assigned U.S. patent application Ser. No. 10/068,650, entitled "A Hardware Circuit and Method for Automatically Configuring On-the-Fly a Sub-Unit of a SCSI Message" of John S. Packer, which is incorporated herein by reference in its entirety, for one example of automated hardware that includes reconfigurable registers used in detecting and modifying a selected unit of a pre-selected message.

As indicated above, in either embodiment, message delay controller 265 is initialized to detect a pre-selected message or each pre-selected message in a plurality of pre-selected messages. Also, message snooping status 245 is set to an initial state that assumes that expander 200 is not in the delay state, e.g., in one embodiment, message-received status flag 247, message-delay status flag 248 and message-release flag 249 are cleared. In addition, the signal on pass-to-delay buffer line 266 is initialized, e.g., cleared, so that path selectors 205 and 206 pass any signals from ports 201 and 202 to pass-thru data bus 207.

TABLE 2 is an example for a SDTR message that is used to explain the operation of message-snooping logic circuit 260.

TABLE 2

| Description | SCSI Bus Phase | Data Bus | ATN |
|---|---|---|---|
| | Bus Free | | |
| | Arbitration | | |
| | ATN Assertion | | |
| | Selection | | ATN |
| | Message Out | C0 | ATN |
| INITIATOR MESSAGES | | | |
| Extended Message | Message Out | 01 | ATN |
| Ext. Message Length | Message Out | 03 | ATN |
| Sync. Data Xfer Req. | Message Out | 01 | ATN |
| Xfer Period (200 ns) | Message Out | 32 | ATN |
| | ATN De-Assertion | | |
| REQ/ACK Offset | Message Out | 07 | |
| TARGET MESSAGES | | | |
| Extended Message | Message In | 01 | |
| Ext. Message Length | Message In | 03 | |
| Sync. Data Xfer Req. | Message In | 01 | |
| Xfer Period (248 ns) | Message In | 3E | |
| REQ/ACK Offset | Message In | 07 | |
| | Command Out | | |

When message delay controller 265 determines that a negotiation sequence is being started on SCSI bus 250, controller 265 generates an active enable signal on delay buffer enable line 267 to message delay buffer 215 while bus phase decode circuit 261 indicates that a SCSI message phase in on SCSI bus 250. Thus, for the example of Table 2, when SCSI bus phase MESSAGE OUT is detected by bus phase decode circuit 261, controller 265 enables message delay buffer 215 and delay message detector 262. Each valid message byte from SCSI bus 250 is loaded into message delay buffer 215.

Message-direction flag 246 is used to indicate the direction of data flow between port 201 to port 202. For this embodiment, message-direction flag 246 is de-asserted to indicate that the data flow is from port 201 to port 202 and conversely is asserted to indicate that the data flow is from port 202 to port 201. TABLE 3 below is an example of one embodiment of the definition of message-direction flag 246 and a direction control signal to bus interface port one circuit 203 and bus interface port two circuit 204.

When extended message code 01h (See Table 2.) is on pass-thru data bus 207, this byte is clocked into message delay buffer 215, and delay message detector 262 analyzes the message byte on bus 207.

TABLE 3

A Definition For One Embodiment of Message-Direction Flag 246

| Flag 246 State | I/O Control | Message From | Message To | Direction Control Signal |
|---|---|---|---|---|
| 0 | De-Asserted | Initiator | Target | 201->202 |
| 0 | Asserted | Target | Initiator | 201->202 |
| 1 | De-Asserted | Initiator | Target | 202->201 |
| 1 | Asserted | Target | Initiator | 202->201 |

Since a SDTR message is passed between initiator 220 and a target device, e.g., target device 221, via an extended message, when delay message detector 262 detects extended message code 01h (See Table 2), detector 262 generates a signal that asserts message-delay status flag 248. The assertion of message-delay status flag 248 indicates to sequencer 230 that a pre-selected message is being processed by expander 200 and that expander 200 has entered a message delay state.

The operations performed by expander 200 in the message delay state depend upon the implementation of message delay controller 265. In this embodiment, message delay controller 265 delays only the last unit of the selected message, e.g., the last byte, until sequencer 230 has analyzed the complete message and asserted message-release flag 249.

Hence, the second byte of the extended message, which defines the number of bytes that follow in the message, is passed from port 201 to port 202 without being delayed. The second byte also is loaded into message delay buffer 215, and into a counter in message unit detector 263.

As each additional byte of the extended message is transferred through expander 200 on bus 207, the byte is loaded into message delay buffer 215, and the value of the counter in message unit detector 263 is decremented. When the counter reaches a value of one, which means that one byte of the extended message remains to be transferred to target device 221, message unit detector circuit 263 asserts a signal on pass-to-delay buffer line 266.

Since the signal from message-direction flag 246 is zero and the signal on pass-to-delay buffer line 266 is one, selector 205 maintains the connection between data bus 209 and pass-thru bus 207. (See Table 1.) Selector 206 disconnects data bus 210 from pass-thru bus 207 and connects message buffer out bus 208 to data bus 210 for this signal combination. Hence, the last byte in the extended message is loaded into message delay buffer 215 from initiator 220, but is not passed to port 202 at this time.

The loading of the last byte of the extended message decrements the value of the counter in message unit detector 263 to zero. Since message unit detector 263 has detected the complete message, message unit detector 263 asserts message-received status flag 247 to indicate to sequencer 230 that a complete pre-selected message, e.g., the extended message from initiator 220 in Table 2, is contained in message delay buffer 215.

After message-received status flag 247 is asserted, sequencer 230 saves the data transfer information in the pre-selected message contained in message delay buffer 215. Sequencer 230 also stores an indicator of the initiator and target combination as well as the state of message-direction flag 246. After this information is saved, sequencer 230 asserts message-release flag 249, and de-asserts message-received status flag 247.

Upon message-release flag 249 being asserted, the last byte of the message in message delay buffer 215 is released by buffer 215 to message-buffer-out bus 208. Hence, the extended message from initiator 220 is delayed until after sequencer 230 processed the message.

After message-received status flag 247 is cleared and the last byte is released from buffer 215, message unit detector 263 clears the signal on pass-to-delay buffer line 266 so that both ports 201 and 202 are again connected to pass-thru bus 207.

When the SCSI bus phase changes from a message phase, delay message detector 262 de-asserts the signal on line 267. However, in the example of Table 2, the SCSI bus phase changes from phase MESSAGE OUT to phase MESSAGE IN and so the enable signal remains asserted on line 267 and delay message detector 262 remains active.

Delay message detector 262 continues to monitor traffic on pass-thru data bus 207 for any one of the pre-selected messages. When the SCSI bus phase changes to phase MESSAGE IN (See Table 2), the state of message-direction flag 246 is changed in expander 200.

Hence, when extended message code 01h (See Table 2.) is on pass-thru data bus 207 from target device 221, this byte is clocked into message delay buffer 215, and delay message detector 262 analyzes the message byte on bus 207.

Since another SDTR message is passed between target device 221 and initiator 220 via an extended message, in response to message code 01h (See Table 2), detector 262 generates a signal to assert message-delay status flag 248, which in this example has no affect, because flag 248 is already asserted.

The second byte of the extended message is passed from port 202 to port 201 without delay. The second byte also is loaded into message delay buffer 215, and into the counter in message unit detector 263.

As each additional byte of the extended message is transferred through expander 200 on bus 207, the byte is loaded into message delay buffer 215, and the value of the counter in message unit detector 263 is decremented. When the counter reaches a value of one, which means that one byte of the extended message remains to be transferred to initiator 220, message unit detector circuit 263 asserts a signal on pass-to-delay buffer line 266.

Since the signal from message-direction flag 246 is now one and the signal on pass-to-delay buffer line 266 is one, selector 206 continues to connect data bus 210 to pass-thru bus 207. (See Table 1.) However, selector 205 disconnects data bus 209 from pass-thru bus 207 and connects data bus 209 to message-buffer-out bus 208 for this combination of signals. Hence, the last byte in the extended message from target 221 is loaded into message delay buffer 215, but is not passed to port 201 at this time.

The loading of the last byte in the extended message decrements the value of the counter in message unit detector 263 to zero. Since message unit detector 263 has detected the complete pre-selected message, message unit detector 263 asserts message-received status flag 247 to indicate to sequencer 230 that a complete pre-selected message, e.g., the target device extended message of Table 2, is contained in message delay buffer 215.

Upon message-received status flag 247 being asserted, sequencer 230 saves the message contained in message delay buffer 215. Sequencer 230 again also stores an indicator of the initiator and target combination as well as the state of message-direction flag 246. After this information message is saved, sequencer 230 asserts message-release flag 249, and de-asserts message-received status flag 247.

Upon message-release flag 249 being asserted, the last byte of the message in message delay buffer 215 is released by buffer 215 to message buffer out bus 208. Hence, the extended message again is delayed until after sequencer 230 processes the pre-selected message.

In the example of Table 2, after the target extended message is passed through expander 200 to initiator 220, the SCSI bus phase changes to phase COMMAND OUT. Consequently, message delay controller 265 de-asserts message-delay status flag 248 and de-asserts the enable signal on line 267 to message delay buffer 215.

When message-delay status flag 248 is de-asserted, the negotiation between initiator 220 and target 221 is complete. Based upon the info saved by sequencer 230 for this initiator-target combination, sequencer 230 determines whether the negotiation was successful. If the negotiation was successful, sequencer 230 updates an element in data transfer options table 241 with the options agreed upon for that initiator-target combination. If the negotiation was unsuccessful, sequencer 230 updates the table element according to the SCSI specification for the particular mode of failure.

In the above implementation of message delay controller 265, only transfer of the last unit, e.g., the last byte, of a multi-unit pre-selected message was delayed. All units preceding the last unit were transferred through expander 200 without delay. This effectively delayed the selected message. Alternatively, in another embodiment, all units of the message could be delayed by controlling path selectors 205 and 206 with the signal on line 267. In yet another embodiment, units from a pre-selected unit to the last unit of a multi-unit message are delayed while the units of the message preceding the pre-selected unit are transferred through expander 200 without delay.

As indicated above, novel expander 200 of this invention can be used with SCSI initiators and SCSI targets that have SCSI characteristics that are different from the SCSI characteristics of expander 200. In one embodiment, to assure that data is transmitted through expander 200 successfully, expander 200 changes the data transfer options in a pre-selected unit of the pre-selected message during a data transfer options negotiation. In particular, the pre-selected unit is the unit that contains the data transfer option or options that must be changed so that expander 200 can successfully transfer data between ports 201 and 202.

Hence, message unit detector 263 is configured to assert a signal on line 266 upon the message unit preceding the pre-selected unit being passed through expander 200. In one embodiment of message unit detector 263, the unit counter output is applied to a first input of a comparator and a second input to the comparator is the unit number of the unit in the pre-selected message that may need to be modified. The output signal from the comparator is an enable signal for optional message unit modification circuit 270 as well as the signal on line 266. One example of a hardware message unit modification circuit 270 is presented in U.S. patent application Ser. No. 10/068,650 of John S. Packer that was cited above, and that description is incorporated herein by reference.

In another embodiment, the output signal from the comparator is applied only to path selectors 205 and 206. After message-received status flag 247 is asserted, sequencer 230 examines the message units stored in buffer 215 and makes any necessary modifications prior to setting message-release flag 249, and prior to saving the data transfer options in the pre-selected message contained in message delay buffer 215.

As another example, initiator 220 that is connected to port 201 selects target 222 that is connected to port 202 of expander 200, and signal ATN is asserted on SCSI bus 250. SCSI target device 222 enters SCSI phase MESSAGE OUT, and initiator 220 sends three messages: identify, tagged queue, and tag.

Figure 3:
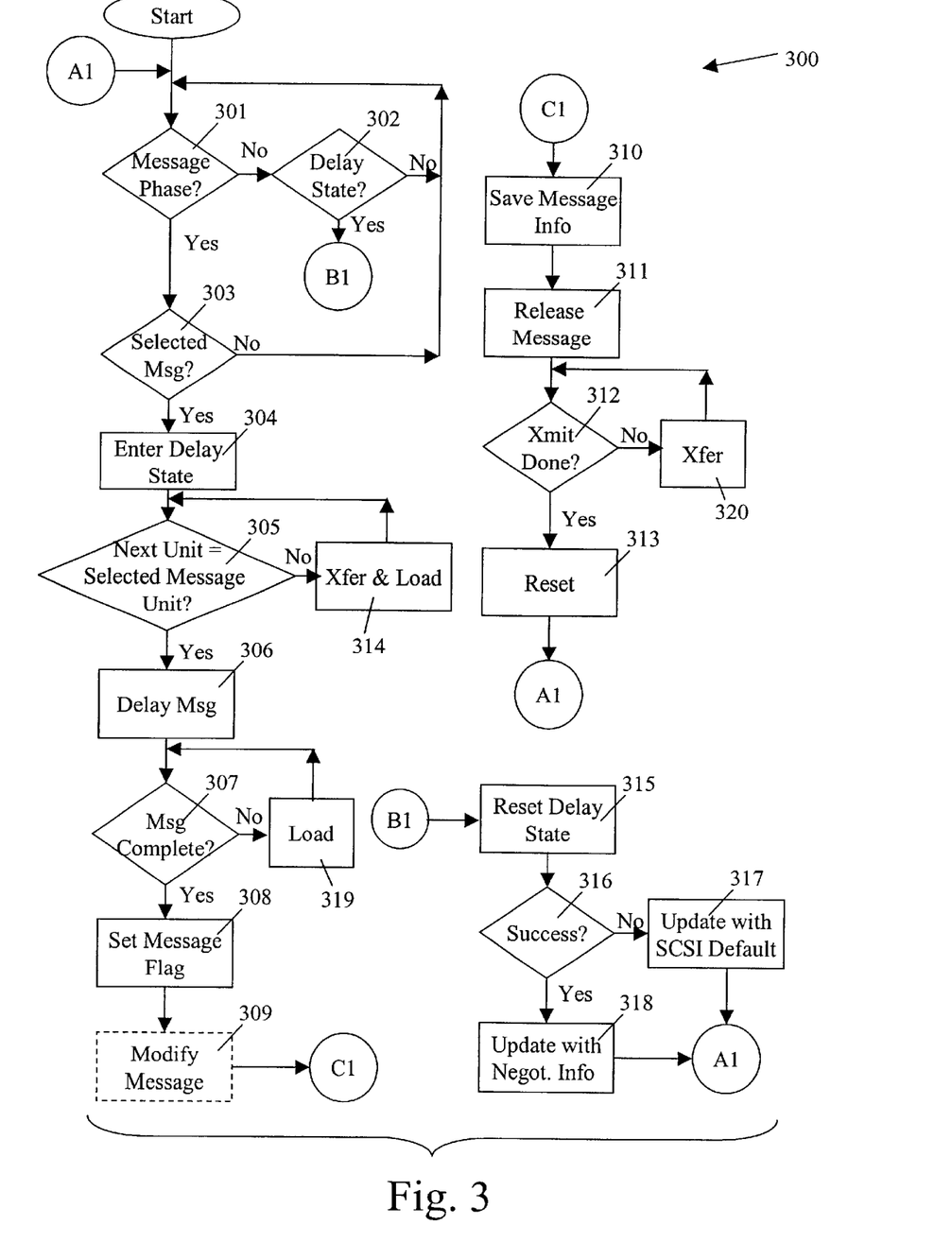
FIG. 3 is a process flow diagram of one embodiment of the snooping process implemented by the SCSI selective options message delay expander of this invention.

As illustrated in FIG. 3, message-snooping logic circuit 260, at this time, effectively idles in message phase check operation 301. More specifically, if the SCSI bus phase is not a message phase, check operation 301 transfers to delay state check operation 302. If the SCSI bus phase was a message phase for a pre-selected message and then changed to a non-message phase, expander 200 would still be in the delay state, and this is the condition checked by operation 302. Since message snooping method 300 is just starting, expander 200 is not in a delay state and so check operation 302 simply returns to message phase check operation 301.

When SCSI phase MESSAGE OUT is detected by bus phase decode circuit 261, delay message detector 262 is enabled, and processing transfers to selected message check operation 303. Since message identify is not a pre-selected message, processing returns to message phase check operation 301. Since the SCSI bus phase does not change, message tagged queue is checked by selected message check operation 303 and processing again returns to message phase check operation 301. This sequence of operations also is performed for message tag, and since a pre-selected message has not been detected, message-delay status flag 248 and message-received status flag 247 remain de-asserted. Information is passed between ports 201 and 202 with only any normal operating delay, i.e., the messages are not delayed for examination by sequencer 230.

Initiator 220 next starts a negotiation with target device 222 to transfer data at 320 megabytes per second via the Packetized SCSI Protocol. Initiator 220 conveys the desire to negotiate by maintaining signal ATN asserted, and target device 222 responds by remaining in phase MESSAGE OUT. Initiator 220 transmits a PPR message to expander 200.

Since the PPR message is a pre-selected message, processing transfers from selected message check operation 303 to enter delay state operation 304. In the embodiment of FIG. 2B, in operation 304, delay message detector 262 asserts message-delay status flag 248, and enables message unit detector 263. As described above, asserting message-delay status flag 248 places expander 200 in the SCSI message delay state.

Operation 304 transfers to next message unit equals selected message unit check operation 305. Operation 305 determines whether transfer of the next message unit is to be delayed, i.e., is the next message unit the pre-selected message unit. If the next message unit is not the pre-selected message unit, processing transfers to transfer and load operation 314 and otherwise to delay message operation 306.

If processing transfers to transfer and load operation 314, the next message unit is passed through expander 200 from port 201 to port 202 over bus 207 and also is loaded into buffer 215. Operation 314 returns to operation 305 and operation 305 is repeated.

Hence, if the entire message is to be delayed, operation 305 transfers to delay message operation 306 immediately. If the third byte of an eight-byte message must be modified, operation 305 transfers to delay message operation 306 after the second byte of the message is passed to the exit port and loaded in message delay buffer 215 by operation 314. If only the last byte of the message is delayed, operation 305 transfers to operation 306 after the next-to-last byte of the message is passed to the exit port and is loaded in message delay buffer 215 by operation 314. In general, when message unit detector 263 determines that the next unit of the message to be received by the input port, e.g., port 201 in this example, is the pre-selected message unit, check operation 305 transfers to delay message operation 306.

In delay message operation 306, the direct message transfer path between the two ports of expander 200 is broken, and the pre-selected message unit and any subsequent message units of the pre-selected message are only loaded in message delay buffer 215. In the embodiment of FIG. 2B, message unit detector 263 asserts a signal on pass-to-delay buffer line 266 to path selectors 205 and 206. In response to the asserted signal, selector 206 disconnects data bus 210 from pass-thru bus 207 and connects data bus 210 to message-buffer-out data bus 208. After breaking the direct message path through expander 200, delay message operation 306 transfers to message complete check operation 307.

Message complete check operation 307 determines whether a predefined number of units, e.g., all the units, of the pre-selected message have been received by expander 200. If not all the units have been received, check operation 307 transfers processing to load operation 319. Load operation 319 loads the next unit of the message into message delay buffer 215 and transfers processing back to message complete operation 307. Processing transfers between operations 307 and 319 until the complete pre-selected message is loaded in message delay buffer 215. When the complete PPR message from initiator 220 is loaded in buffer 215, processing transfers from check operation 307 to set message flag operation 308.

In set message flag operation 308, message-received status flag 247 is set to indicate to sequencer 230 that the complete PPR message is contained in buffer 215. Operation 308 transfers to modify message operation 309.

Modify message operation 309 is optional. If expander 200 needs to change the message so that the data transmitted between ports 201 and 202 is compatible with the characteristics of expander 200, this is done in modify message operation 309. For example, the PPR message from initiator 220 requested a data transfer at 320 megabytes per second. However, expander 200 only supports data transfer at 160 megabytes per second. Hence, the PPR message is modified to request a 160-megabyte per second transfer rate in modify message operation 309. As described above, this modification can be done either with a message unit modification circuit 270 or by sequencer 230. The parity information in the message is modified to be consistent with any changes made to the message by expander 200. However, any incoming parity error is repeated. Upon completion of operation 309, processing transfers to save message info operation 310.

In save message info operation 310, sequencer 230 copies the data transfer information contained in buffer 215 to a scratch storage location in memory 240. Sequencer 230 also saves information, with the data transfer information, that specifies the direction of data transfer and the initiator-target combination. Upon completion of operation 310 processing transfers to release message operation 311.

In release message operation 311, sequencer 230 asserts release message flag 249, and transfers processing to transmission done check operation 312. If any units of the pre-selected message in buffer 215 have not been passed through expander 200, check operation 312 transfers processing to transfer operation 320. Transfer operation 320 transfers the next unit of the message that has not been transferred through expander 200 to the exit port and returns processing to check operation 312.

Processing continues to cycle between operations 312 and 320 until the last unit of the pre-selected message is released from buffer 215 and then check operation 312 transfers to reset operation 313. Hence, upon release message flag 249 being asserted, any message units that have not been transferred to port 202 are released from buffer 215 to message-buffer-out data bus 208.

In reset operation 313, message-received status flag 247 and release message flag 249 are reset. Operation 313 transfers processing to message phase check operation 301.

In this example, when target 222 receives the complete PPR message, target 222 detects a parity error in the PPR message. Target 222 signals the error to initiator 220 by asserting request signal REQ while in SCSI bus phase MESSAGE OUT. Initiator 220 recognizes the persisting phase MESSAGE OUT as a request to resend the PPR message, which initiator 220 does.

Operations 304 to 313 are repeated as just described. Since the PPR message is from the same port, i.e., port 201, as the first PPR message, sequencer 230 recognizes that the second message is not a response to the first message but instead is a retry. Consequently, the information saved from the first message is overwritten by information in the second PPR message in operation 310. Reset operation 313 transfers to message phase check operation 301.

Target 222 changes the SCSI bus phase to phase MESSAGE IN, and transmits a PPR message, which is the third message in the current exchange. Hence, message phase check operation 301 transfers to selected message check operation that in turn transfers to enter delay state operation 304. Operations 304 to 313 are again performed. In delay message operation 306, the operations are different because message-direction flag 246 has a different state. The operation performed in delay message operation 306 for path selectors 205 and 206, in this embodiment, is described by TABLE 1. Upon completion of operation 313, processing returns to message phase check operation 301.

If the SCSI bus phase changes from a message phase, check operation transfers to delay state check operation 302. Since message-delay status flag 248 is asserted, expander 200 is in the message delay state. Consequently, delay state check operation 302 transfers to reset delay state operation 315.

In reset delay state operation 315, message delay controller 265 resets flag 248 and transfers processing to success check operation 316. In check operation 316, sequencer 230 examines the saved message information for the current negotiation and determines that the third message completed the negotiation successfully because the third message was received from a port that was different from the port from which the second message was received.

Accordingly, check operation 316 transfers to update with negotiated information operation 318. In operation 318, sequencer 230 saves the data transfer options from the third message in the element of data transfer options table 241 associated with the combination of initiator 220 and target 222.

If the negotiation was unsuccessful, check operation 316 transfers to update with SCSI default operation 317. In operation 317, sequencer 230 saves the default data transfer options defined by the SCSI protocol in the element of data transfer options table 241 associated with the combination of initiator 220 and target 222.

If after processing the third message, the SCSI bus phase remained in a message phase, operations 303 to 313 would have been repeated again for the fourth message. After the fourth message was processed, if the SCSI bus phase changed to other than a message phase, operations 315 to 318 would be performed as appropriate. Method 300 handles correctly any of the many other possible message sequences that can occur in a data transfer options negotiation between a SCSI initiator and a SCSI target.

Message snooping method 300 is advantageous because hardware message-snooping logic circuit 260 only has to recognize messages of interest, i.e., the pre-selected message or plurality of pre-selected messages, and to delay the pre-selected message when the pre-selected message is recognized. All negotiation protocol observations are performed by sequencer 230. Sequencer 230 maintains data transfer options table 241 for expander 200. Having sequencer 230 maintain table 241 is advantageous over an equivalent hardware implementation, because the possible negotiation message sequences can be quite complex, and the SCSI specifications for such negotiations continually change. Sequencer firmware is easier to write and modify than reconfiguring or redesigning hardware logic.

In view of this disclosure, the novel message snooping process of this invention can be implemented by those of skill in the art in a wide variety of hardware configurations in a SCSI expander. Consequently, the embodiments disclosed herein are illustrative only and are not intended to limit the invention to the specific embodiments disclosed.

Also, the principles of this invention can be used in SCSI expanders that support protocols that are different from the present SCSI protocols. For example, presently the SCSI protocols do not define data transfer option negotiation messages that have a size greater than eight bytes, and so an eight-byte message delay buffer 215 is sufficient. However, if a future SCSI protocol defines a message greater than eight bytes, the message would be processed eight bytes at a time, as described above. The snooping logic would be modified to indicate when the buffer is full and when a complete message has been processed.

We claim:

1. A SCSI expander comprising:
    a first port;
    a second port;
    a message delay buffer coupled to said first port and to said second port;
    a message snooping status comprising a plurality of message status flags; and
    a message-snooping logic circuit coupled to said message delay buffer and to said message snooping status wherein upon detection of a pre-selected message being transferred between said first and second ports, said message-snooping logic circuit (i) asserts one of said plurality of message status flags, (ii) enables said message delay buffer to receive said selected message, and (iii) delays transfer of said pre-selected message between said first and second ports.

2. The SCSI expander of claim 1 wherein said one of said plurality of message status flags is a message-delay status flag.

3. The SCSI expander of claim 1 wherein said plurality of message status flags includes a message-direction flag wherein a state of said message-direction flag indicates a direction of transfer of said message between said first and second ports.

4. The SCSI expander of claim 1 wherein said plurality of message status flags includes a message-received status flag wherein a state of said message-received status flag indicates said message delay buffer contains at least a predefined number of units of said pre-selected message.

5. The SCSI expander of claim 1 wherein said plurality of message status flags includes a message-release flag having a first state and a second state wherein said second state of said message-release flag indicates that any un-transferred units of said pre-selected message contained in said message delay buffer can be transferred through said SCSI expander.

6. The SCSI expander of claim 1 further comprising:
    a sequencer coupled to said message snooping status and to said message delay buffer.

7. The SCSI expander of claim 6 wherein said plurality of message status flags includes a message-received status flag having a first state and a second state wherein said second state of said message-received status flag indicates said message delay buffer contains at least a predefined number of units of said pre-selected message.

8. The SCSI expander of claim 7 wherein upon detecting said second state of said message-received status flag, said sequencer saves information contained in said message delay buffer as saved message information.

9. The SCSI expander of claim 8 further comprising:
    a data transfer option table stored in a memory coupled to said sequencer, wherein said sequencer updates said data transfer option table using said saved message information upon determining that a SCSI data transfer option negotiation completed successfully.

10. The SCSI expander of claim 8 wherein said plurality of message status flags includes a message-direction flag having a first state and a second state wherein said first and second states of said message-direction flag indicate directions of data transfer between said first and second ports.

11. The SCSI expander of claim 10 wherein said saved information further comprises said message-direction flag.

12. The SCSI expander of claim 8 wherein said plurality of message status flags includes a message-release flag wherein a state of said message-release flag indicates that any un-transferred units of said pre-selected message contained in said message delay buffer can be transferred through said SCSI expander.

13. The SCSI expander of claim 1 further comprising:
    a message unit modification circuit coupled to said message-snooping logic circuit and to said message delay buffer, wherein said message unit modification circuit modifies a unit of said pre-selected message contained in said message delay buffer.

14. A SCSI expander comprising:
a first port;
a second port;
a message delay buffer coupled to said first port and to said second port;
a message snooping status comprising:
   a message-direction flag having a first state and a second state wherein said first and second states of said message-direction flag indicate directions of data transfer between said first and second ports;
   a message-received status flag having a first state and a second state;
   a message-delay status flag having a first state and a second state; and
   a message-release flag having a first state and a second state;
a message-snooping logic circuit coupled to said message delay buffer and to said message snooping status wherein following detection, by said message-snooping logic circuit, of a pre-selected message being transferred between said first and second ports, said message-snooping logic circuit (i) changes said message-delay status flag from said first state to said second state, (ii) enables said message delay buffer to receive said selected message, (iii) delays transfer of said pre-selected message between said first and second ports and (iv) changes said message-received status flag from said first state to said second state upon said pre-selected message being contained in said message delay buffer; and
a sequencer coupled to said message snooping status and to said message delay buffer wherein said sequencer saves information contained in said message delay buffer as saved information following said message-received status flag changing from said first state to said second state, and said sequencer changes said message-release flag from said first state to said second state.

15. The SCSI expander of claim 14 further comprising:
a data transfer options table store in a memory coupled to said sequencer.

16. In a SCSI expander, a method comprising:
monitoring messages transferred between a first port and a second port of said SCSI expander for a message used for negotiating data transfer options over a SCSI bus; and
delaying transfer of said message between said first and second ports of said SCSI expander upon said monitoring messages detecting said message.

17. The method of claim 16 wherein said delaying transfer of said message further comprises:
delaying transfer of only a portion of said message.

18. The method of claim 17 wherein said portion is said message.

19. The method of claim 17 wherein said portion is a last unit of said message.

20. The method of claim 17 wherein said portion includes units in said message from a pre-selected unit of said message to a last unit of said message.

21. The method of claim 16 wherein said monitoring is performed only during SCSI bus message phases.

22. The method of claim 16 wherein said delaying transfer of said message further comprises:
asserting a message-delay status flag upon said monitoring messages detecting said message.

23. The method of claim 16 wherein said delaying transfer of said message further comprises:
loading said message into a message delay buffer.

24. The method of claim 23 wherein said delaying transfer of said message further comprises:
asserting a message-received status flag upon said message being loaded in said message delay buffer.

25. The method of claim 24 wherein said delaying transfer of said message further comprises:
saving information in said message upon said message-received status flag being asserted.

26. The method of claim 25 wherein said delaying transfer of said message further comprises:
asserting a message-release flag after said saving information.

27. The method of claim 26 further comprising:
releasing any portion of said message from said message delay buffer that has not been transferred through said SCSI expander.

28. The method of claim 27 wherein said any portion is said message.

29. The method of claim 27 any portion is a last unit of said message.

30. The method claim 27 wherein said any portion includes units in said message from a pre-selected unit of said message to a last unit of said message.

31. In a SCSI expander, a method comprising:
detecting a message phase on a SCSI bus;
monitoring, upon detecting said message phase, messages transferred between a first port and a second port of said SCSI expander for a message used in negotiating data transfer options over said SCSI bus;
entering a message delay state upon said monitoring messages detecting said message;
determining whether a next unit of said message to be transferred between said first and second ports is a pre-selected unit;
transferring said next unit between said first and second ports and loading said next unit into a message delay buffer, upon determining said next unit of said message is not said pre-selected unit; and
loading said next unit into said message delay buffer and delaying transfer of said next unit and any subsequent units of said message between said first and second ports, upon determining said next unit of said message is said pre-selected unit.

32. The method of claim 31 further comprising;
loading said any units of said message, subsequent to said pre-selected unit, into said message delay buffer.

33. The method of claim 32 further comprising:
asserting a message-received status flag upon said message being loaded in said message delay buffer.

34. The method of claim 33 further comprising:
saving information in said message upon said message-received status flag being asserted.

35. The method of claim 34 further comprising:
asserting a message-release flag after said saving information.

36. The method of claim 35 further comprising:
transferring said pre-selected unit and said any subsequent units of said message through said SCSI expander.

37. The method of claim 31 wherein said pre-selected unit is a first unit of said message.

38. The method of claim 31 wherein said pre-selected unit is a last unit of said message.

39. The method of claim 31 wherein said pre-selected unit is a unit between a first unit of said message and a last unit of said message.

40. The method of claim 31 further comprising:

modifying a unit of said message in said message delay buffer.

41. In a SCSI expander, a method comprising:

detecting a message phase of a SCSI bus;

monitoring messages transferred between a first port and a second port of said SCSI expander for a message used in negotiating data transfer options over said SCSI bus, upon detecting said message phase;

entering a message delay state upon said monitoring messages detecting said message;

determining whether a next unit of said message to be transferred between said first and second ports is a pre-selected unit;

transferring said next unit between said first and second ports and loading said next unit into a message delay buffer, upon determining said next unit of said message is not said pre-selected unit;

loading said next unit into said message delay buffer and delaying transfer of said next unit and any subsequent units of said message between said first and second ports, upon determining said next unit of said message is said pre-selected unit;

loading said any subsequent units of said message into said message delay buffer;

modifying a unit of said message in said message delay buffer;

asserting a message-received status flag upon said message being loaded in said message delay buffer; and saving information in said message upon said message-received status flag being asserted.

* * * * *